UNITED STATES PATENT OFFICE.

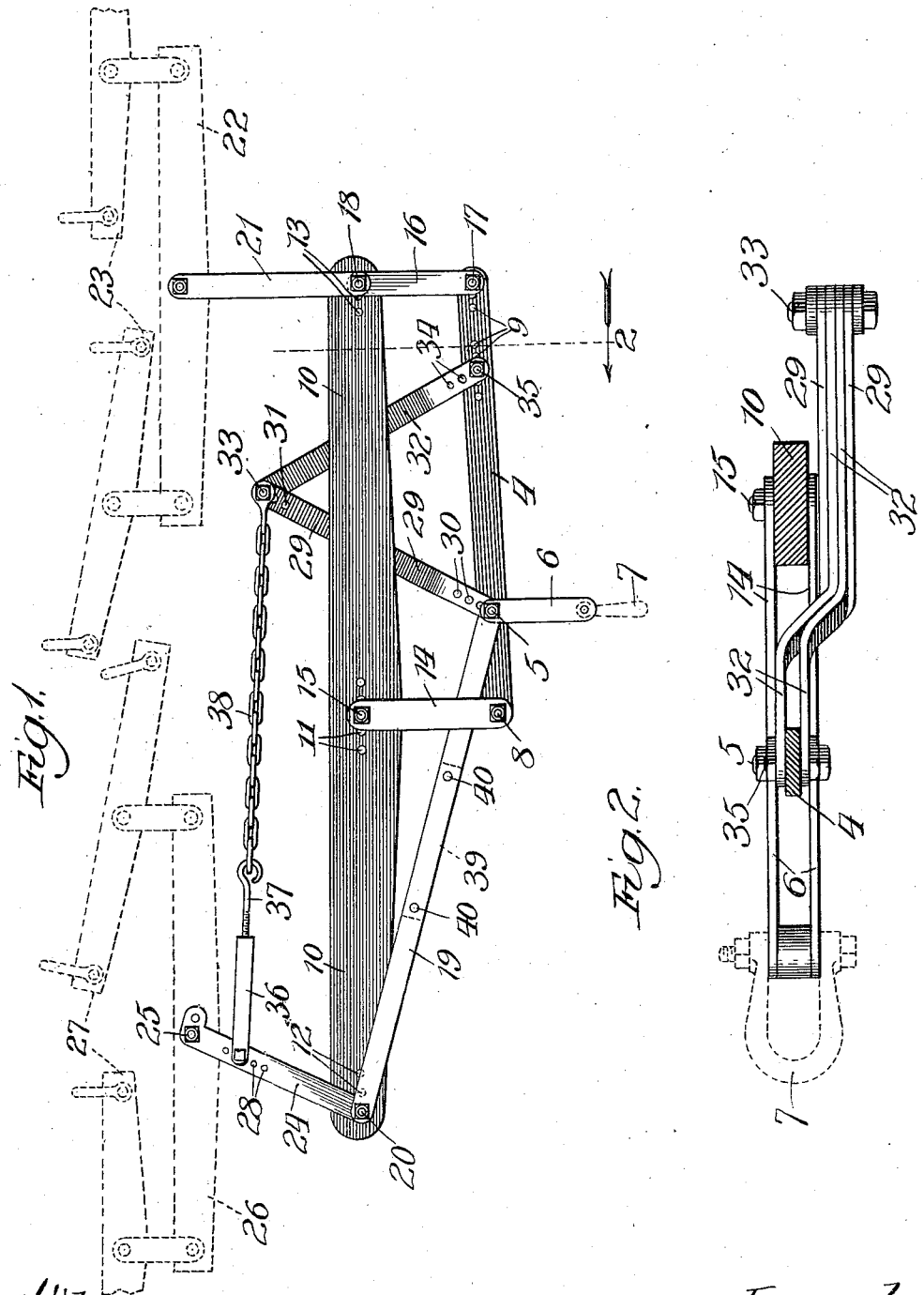

GEORGE W. RAYMOND, OF MORRIS, ILLINOIS.

DRAFT-EQUALIZER.

No. 862,413.

Specification of Letters Patent.

Patented Aug. 6, 1907.

Application filed March 25, 1907. Serial No. 364,238.

*To all whom it may concern:*

Be it known that I, GEORGE W. RAYMOND, a citizen of the United States, residing at Morris, in the county of Grundy and State of Illinois, have invented a new and useful Improvement in Draft-Equalizers, of which the following is a specification.

My invention relates to improvements in the construction of draft-equalizers forming the subject of Letters Patent Number 837,727, granted to me December 4, 1906. Draft-equalizers of this type are employed in connection with plows and agricultural machines generally, to avoid side-draft where the line of pull is to one side of the line of greatest resistance; and my invention relates, more particularly, to draft-equalizers where it is desired that the point of attachment with the plow, or the like, shall be at one side of a line midway between the outer draft-animals.

My object is to provide a construction that will be positive in operation and by which equalization of draft may be effected more quickly than by my said former patented construction.

Referring to the accompanying drawings,—Figure 1 is a plan view of my improved equalizer especially adapted for plows, indicating by dotted lines the points at which the doubletrees with swingletrees for four horses, are attached; and Fig. 2, an enlarged broken section taken at the line 2 on Fig. 1 and viewed in the direction of the arrow.

A lever or main doubletree 4, which may be a steel bar of the shape shown, is provided with a bolt-opening approximately in the position represented, for a bolt 5, in the nature of a king-bolt, to which a link 6, consisting of upper and lower members, is pivotally secured, a clevis 7 being pivotally secured to the free end of this link. The bolt 5 forms a fulcrum for the lever 4, on the short arm of which lever, in the position shown, is an opening for a bolt 8, and in the outer end-portion of which is a series of bolt-openings 9. In a double-tree 10 is provided, along its central portion, a series of bolt-openings 12 and 13. A center link 14, consisting of upper and lower metal straps, is pivotally connected at one end to the bolt 8 and at its opposite end to a bolt 15 in one of the openings 11. An end link 16 is pivotally connected at one end to a bolt 17 in one of the openings 9 and at its opposite end to a bolt 18 in one of the openings 13. The links 14 and 16 tend to hold the bars or eveners 4 and 10 in parallel relation to each other.

A link 19 is pivotally connected at one end to the bolt 5 and at its opposite end to a bolt 20 in one of the openings 12.

Pivotally fastened to the bolt 18 is a draft-attaching link 21 having a bolt-opening in its outer end-portion for attachment to a doubletree 22 carrying the swingletrees 23. An obliquely-disposed draft-animal attaching link 24 is pivotally connected at one end to the bolt 20 and at its opposite end has a pair of parallel bolt-openings through either of which a bolt 25 may be passed for the attachment of a doubletree 26, carrying swingle-trees 27. Between the ends of the link 24 in the position shown is a series of bolt-openings 28. A bar 29 consisting of upper and lower members as shown in Fig. 2 normally extends in a direction oblique to the rod 14, and substantially parallel with the link 24, and is provided with a series of bolt-openings 30 in one end-portion at one of which it is pivotally secured to the bolt 5 and in its opposite end it has a series of bolt-openings 31. A bar or connecting medium 32, slightly shorter than the bar 29, likewise extends in a direction oblique to the bar 14, with its outer end provided with an opening to receive a bolt 33 at which it is attached to the bar 29 at one of the openings 31. In the opposite end portion of the bar 32 is a series of bolt-openings 34 for a bolt 35 at which the bar is attached to one of the openings 9 in the lever 4.

A clip 36 is pivotally connected to a bolt in one of the openings 28 of the link 24. In the end of the clip is an opening to receive the threaded shank of a hook 37 adjustably retained therein as by a nut and join-nut (not shown). A chain 38, or other suitable, preferably flexible medium or link connection, is attached at one end to the bolt 33 and at its opposite end to the hook 37.

All the bolt-openings described are somewhat larger in diameter than the bolts they receive to admit of slight independent play between the parts at all the joints.

It will be understood that the object of the equalizer is to cause pairs of draft-animals hitched to the swingle-trees 23 and 27, respectively, to exert substantially equal pulling force upon the plow connected at 7 in a manner to avoid side-draft. The doubletree 22 is materially closer to the longitudinal plane of the clevis 6 than the doubletree 26. The pull upon the doubletree 22 through the links 21 and 16 is in a direction which would tend to swing the lever or evener 4 upon the fulcrum 5 and the doubletree or evener 10 upon the fulcrum 15. Forward pull upon the doubletree 26 would tend to cause it to swing the evener 10 upon its fulcrum 15 and the doubletree 4 upon its fulcrum 5. The point of connection 20 being materially further laterally from the point 5 than the point 18, the leverage from that side would be materially greater. This excess of leverage is overcome, however, by causing the link 24 to extend obliquely, as indicated, and in its tendency to straighten, under a pull upon the doubletree 26, to draw upon the chain 38 against the apex 33 of the triangle formed by the parts 4, 29 and 32. This compensates for the excess in length of leverage on that side over the other side, and thus produces the same effect as would be caused by connecting the clevis 6 to the doubletree 10 midway between the bolts 18 and 20.

By providing the bars 29 and 32, in the upwardly converging relation illustrated, the pull exerted upon the bar 32 when the link 24 is drawn upon, is substantially a forward pull, as described, but sufficient lateral pull is also thereby exerted against the bar 4 to balance the contrarily exerted push of the bar 19 and thus maintain the clevis 6 in substantially parallel relation with the link 14; thereby overcoming a defect in my said patented construction, in which the side-pull on the bar 32 is greater than the pushing force exerted through the bar 19, causing a tendency in the equalizer to shift laterally. Furthermore, by positioning the bars 29 and 32, as shown, equalization of forward draft is quickly effected, since the distance through which the lower end of the bar 32, moves toward an imaginary line drawn perpendicularly through the apex 33 is much less than the corresponding bar of my said patented construction moves.

To permit of the use of lighter members, forming the bar 19, I provide a stay-block 39 secured between the members, as by rivets 40, for the purpose of preventing buckling of the bar 19.

What I claim as new, and desire to secure by Letters Patent, is:—

1. In a draft-equalizer, the combination of a lever with means for connecting it at its fulcrum with a plow or other implement, a main doubletree, a center link connecting the doubletree towards its center to the said lever near and at one side of the said fulcrum thereof, an end-link connecting said doubletree and lever near their ends at the opposite side of said fulcrum, a bar extending forward from said lever adjacent to the fulcrum thereof and held against independent movement thereon in the direction away from said end-link, a draft-animal-attaching link extending forward from the said doubletree adjacent to said end-link, a second draft-animal-attaching link extending obliquely forward from the opposite end-portion of said doubletree and inclined toward the center thereof, a pivotal link-connection between said second link and the upper end of said bar, and a link pivotally connecting the end-portion of said doubletree adjacent to said second link directly with the fulcrum of said lever.

2. In a draft-equalizer, the combination of a lever with means for connecting it at its fulcrum with a plow or other implement, a main doubletree, a center link connecting the doubletree towards its center to the said lever near and at one side of the said fulcrum thereof, an end-link connecting said doubletree and lever near their ends at the opposite side of said fulcrum, a bar extending obliquely forward toward the said end-link from said lever adjacent to the fulcrum thereof, a link-connection extending between the forward end-portion of said oblique bar and the end-portion of said lever near said end-link and forming with said bar and lever a triangle having two forwardly converging sides, a draft-animal-attaching link extending forward from the said doubletree adjacent to said end-link, a second draft-animal-attaching link extending obliquely forward from the opposite end-portion of said doubletree and inclined toward the center thereof, and a pivotal link-connection between said second link and the apex portion of said triangle.

3. In a draft-equalizer, the combination of a lever with means for connecting it at its fulcrum with a plow or other implement, a main doubletree, a center link connecting the doubletree toward its center to the said lever near and at one side of the said fulcrum thereof, an end-link connecting said doubletree and lever near their ends at the opposite side of said fulcrum, a bar extending obliquely forward toward the end-link from said lever adjacent to the fulcrum thereof, a link connection extending between the forward end-portion of said oblique bar and the end-portion of said lever near said end-link and forming with said bar and lever a triangle, having two forwardly converging sides, a draft-animal-attaching link extending forward from the said doubletree adjacent to said end-link, a second draft-animal-attaching link extending obliquely forward from the opposite end-portion of said doubletree and inclined toward the center thereof, a pivotal link connection between said second link and the apex portion of said triangle and a pivotal link-connection between the end-portion of said doubletree adjacent to said second link and the end-portion of said lever.

4. In a draft-equalizer, the combination of a lever with means for connecting it at its fulcrum with a plow or other implement, a main doubletree, a center link connecting the doubletree toward its center to the said lever near and at one side of the said fulcrum thereof, an end-link connecting said doubletree and lever, near their ends at the opposite side of said fulcrum, a bar extending obliquely forward toward the said end-link from said lever adjacent to the fulcrum thereof, a link-connection extending between the forward end-portions of said oblique bar and the end-portion of said lever near said end-link and forming with said bar and lever a triangle, having two forwardly converging sides, a draft-animal-attaching link extending forward from the said doubletree adjacent to said end-link, a second draft-animal-attaching link extending obliquely forward from the opposite end-portion of said doubletree and inclined toward the center thereof, and a pivotal link-connection between said second-link and the apex portion of said triangle, the said center link, end-link and draft-animal-attaching links being adjustable longitudinally of the doubletree and the said end-link being also adjustable longitudinally of the lever, for the purpose set forth.

GEORGE W. RAYMOND.

In the presence of—
A. H. HILLIKER,
W. E. VINER.